D. J. SCOTT.
TOOL HANDLE.
APPLICATION FILED SEPT. 17, 1912.

1,075,732.

Patented Oct. 14, 1913.

WITNESSES
Louis Lucia
G. J. Sullivan

INVENTOR
Don J. Scott;
BY
H. E. Hart
his ATTORNEY

UNITED STATES PATENT OFFICE.

DON J. SCOTT, OF NEW BRITAIN, CONNECTICUT.

TOOL-HANDLE.

1,075,732.  Specification of Letters Patent.  Patented Oct. 14, 1913.

Application filed September 17, 1912. Serial No. 720,768.

*To all whom it may concern:*

Be it known that I, DON J. SCOTT, a citizen of the United States, and a resident of New Britain, in the county of Hartford, State of Connecticut, have invented certain new and useful Improvements in Tool-Handles, of which the following is a specification.

This invention is to produce a structure of the character described having features of novelty and advantage.

Figure 1:
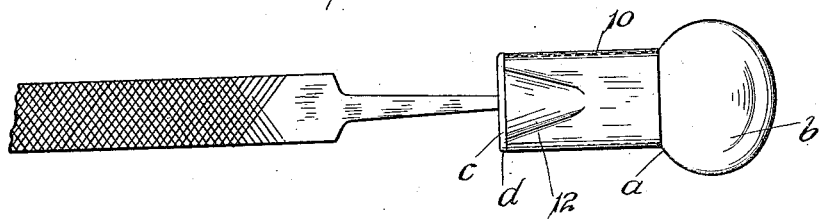
Figure 3:
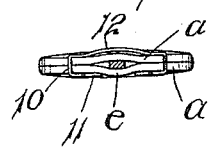
Figure 2:
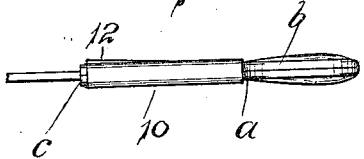
Figures 5, 6:
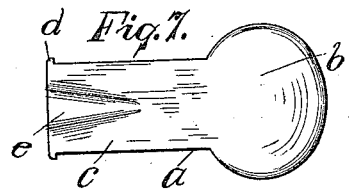
Figure 7:
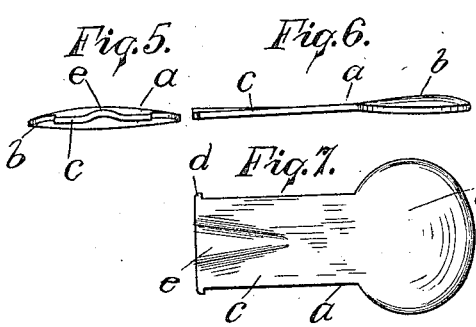
Figure 4:
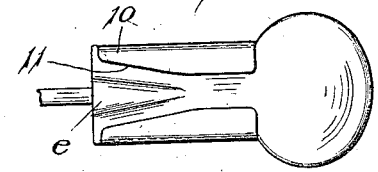
Figure 9:
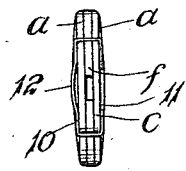
Figure 8:
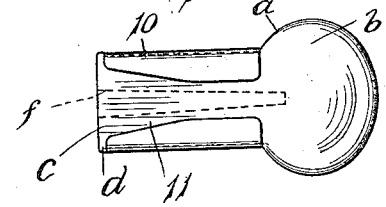

In the drawings—Figure 1 is a side view of a handle made in accordance with my invention, applied to a tool. Fig. 2 is an edge view thereof. Fig. 3 is an end view. Fig. 4 is a side view the reverse of Fig. 1. Figs. 5, 6 and 7 are detail views of a handle member. Figs. 8 and 9 are side and end views respectively of a modification.

A handle made in accordance with my invention comprises a pair of similarly shaped, oppositely arranged members made preferably of fiber or like material, and with their shanks secured together by a metallic clamp, with provisions for spreading apart of the shanks when a tool is driven into the handle.

*a* denotes one of the handle members provided with the round pad *b* and a shank *c*, at the end of which are slight projections *d* at each edge to assist in positioning the clamp as will be hereinafter described.

The pad is preferably dished to give a thicker and better fitting handle and is bent slightly out of the plane of the shank as clearly seen in Fig. 6, which results in a better and tighter fit together of the two handle members when they are secured by the clamp.

The clamp 10 fits between the pad and the projections *d* and is folded around the shanks of a pair of oppositely disposed members *a* to securely bind them together with the shanks in intimate contact with one another. The edges of the clamp are spaced slightly apart as seen in Fig. 4 and diverging at their ends leave the V shaped space 11 which will allow the member *a* at that side to give slightly when a tool is being driven in. The side of the clamp opposite this V shaped opening has an offset 12 stamped into it providing space for the spreading of this handle member. In order to make sure that the shank of the tool be inserted properly between the members *a a* they are slightly grooved on the other opposing surfaces as indicated at *e.*

For heavier tools a filler *f* is inserted between the two handle members as indicated in Figs. 8 and 9, the filler having a tapering slot to receive the tool shank. The number of these filler pieces employed is immaterial.

It will be apparent from the foregoing that there is thus provided a tool handle of very inexpensive construction, one that will grip and hold the tool firmly, which is almost indestructible when used with any reasonable degree of care and which can be readily applied to and removed from the tool. The material of the handle members should have sufficient resiliency or elasticity to take a strong grip on the tool shank and to resume approximately their ordinary positions when the tool shank is removed.

The shape or contour of the completed handle may be changed as desired but it is convenient to dish the pad portion so that it will fit the hand and be more convenient for use.

I claim as my invention:

1. As a new article of manufacture, a tool handle comprising a pair of similarly shaped thin flat members of elastic material, provided with shanks and pads, said members being arranged face to face, means for permanently securing said members together at their shanks, said securing means being provided with expansion spaces centrally of the ends of said shanks.

2. As a new article of manufacture, a handle comprising a pair of thin flat handle members of elastic fibrous material, oppositely-arranged face to face, a non-elastic clamping band encircling the shanks of said handle members and fixedly secured thereto to clamp the edge portions thereof securely together, the central portions of said handle members at the end of the shank being free for lateral displacement to permit of the insertion of the tang of a tool.

3. As a new article of manufacture, a handle comprising a pair of thin flat handle members of elastic fibrous material, bowed longitudinally and arranged oppositely, and fixed means for clamping the edges of the shanks of said members securely together face to face, the central portion of the shanks at the end being free for lateral displacement upon the insertion of the tang of a tool.

4. As a new article of manufacture, a handle formed of two leaves having pads and shanks, and oppositely bowed from end to end, fixed means at the edges of the shanks for drawing them together and securing them in position, the central portions of the shanks at the end being free for lateral displacement upon the insertion of the tang of a tool.

5. As a new article of manufacture, a handle comprising a pair of thin flat handle members of elastic material fitted together, a non-elastic binding clamp folded around one side of the shanks of said members and with its edges lapped onto the other side, the edges of said binding clamp flaring outwardly toward the ends of the shank, and a corresponding tapering offset formed in the other side of said clamp to permit of the lateral displacement of the handle members centrally at the end of the shank.

DON J. SCOTT.

Witnesses:
F. H. JUNGEN,
IDA M. SANDERSON.

Copies of this patent may be obtained for five cents each, by addressing the "Commissioner of Patents, Washington, D. C."